United States Patent [19]

Morita et al.

[11] 4,383,301

[45] May 10, 1983

[54] MEASURING AND CALCULATING INSTRUMENT

[76] Inventors: Deen I. Morita, 1658 Auiki St., Honolulu, Hi. 96819; George M. Nakasone, 6944 Niumalu Loop, Honolulu, Hi. 96825

[21] Appl. No.: 794,216

[22] Filed: May 5, 1977

[51] Int. Cl.³ .............................................. G01B 5/26
[52] U.S. Cl. .................................... 364/562; 33/124; 33/141 E; 364/715
[58] Field of Search .......... 235/151.3, 151.32, 92 DN, 235/152, 156; 33/121-124, 125 M, 125 R, 141 R, 142, 141 E, 137-139; 242/84.8; 364/561, 562

[56] References Cited

U.S. PATENT DOCUMENTS

| | | | |
|---|---|---|---|
| 3,654,449 | 4/1972 | Boyce | 235/156 |
| 3,777,126 | 12/1973 | Hoff | 235/156 |
| 3,916,174 | 10/1975 | Moule | 235/92 DN |
| 3,999,298 | 12/1976 | Nishimura | 33/141 R |
| 4,031,360 | 6/1977 | Soule, Jr. | 33/139 |

Primary Examiner—Errol A. Krass
Attorney, Agent, or Firm—Robert E. Burns; Emmanuel J. Lobato; Bruce L. Adams

[57] ABSTRACT

A hand held calculator having a key board with numerical keys and function keys and a visual display is provided at one corner with a rotatable measuring wheel which projects beyond the perimeter of the calculator case so that it can be rolled along a selected line, for example a line on a building plan or map to measure the length of the line. Means is provided for sensing rotation of the wheel and generating a unit signal pulse for each increment of rotation of the wheel. These signal pulses are fed into the calculator circuitry as unit entries and are automatically added to obtain a total measurement entry representing the length of the line. Numerical keys and function keys of the calculator are thereupon manually operable so as to perform additional arithmetic operations on the measurement entry, for example multiplication or division.

8 Claims, 4 Drawing Figures

MEASURING AND CALCULATING INSTRUMENT

FIELD OF INVENTION

The present invention relates to a self-contained hand-held measuring and calculating instrument which is particularly useful in the building trades.

BACKGROUND OF THE INVENTION

Hand-held calculators are widely used in the building trade, for example in estimating the cost of materials such as pipes, condits, ducts, wiring and cabling. They are likewise useful in calculating such things as the cost of real estate and the heating and air conditioning requirements of a building.

However, the usefulness of calculators in such operations is somewhat restricted. For example in estimating the cost and material required for a heating, plumbing or wiring installation in a building, the architect or engineer must first obtain certain measurements, for example by measuring a scale drawing with a ruler and feed these measurements into the calculator. He must thus perform the two successive functions of first obtaining the measurement values and then using these values in his calculations.

SUMMARY OF THE INVENTION

It is an object of the present invention to increase the usefulness of a hand-held calculator by enabling it to make the initial measurements which are entered directly and automatically into the calculator thereby eliminating the step of making measurements with a scale. In accordance with the invention a hand-held calculator is provided at one corner with a rotatable measuring wheel which projects beyond the perimeter of the calculator case so that the wheel can be rolled along a selected line, for example a line on a scale drawing by movement of the case along the line. Means is provided for sensing rotation of the wheel and generating a unit signal pulse for each increment of rotation of the wheel. These unit signal pulses are automatically fed into the circuitry of the calculator as units of measurement and are automatically added by the calculator circuitry so as to obtain a total measurement entry representing the length of the line measured. After automatic entry of the measurement in this manner, numerical keys and function keys of the calculator are manually operable to perform additional arithmetic operations, for example multiplication or division.

The combined measuring and calculating instrument in accordance with the invention is thus highly useful in the building trades, for example in determining the quantities of material required and in estimating cost. Uses in other fields when working with scale drawings, maps or charts will be readily perceived. For example by the use of a map and an instrument in accordance with the present invention, the fuel requirements and cost of a proposed trip can be readily estimated.

BRIEF DESCRIPTION OF DRAWINGS

The nature, object and advantages of the invention will be more fully understood from the following description of a preferred embodiment illustrated by way of example in the accompanying drawings in which.

DESCRIPTION OF PREFERRED EMBODIMENT

Figures 1, 1A:
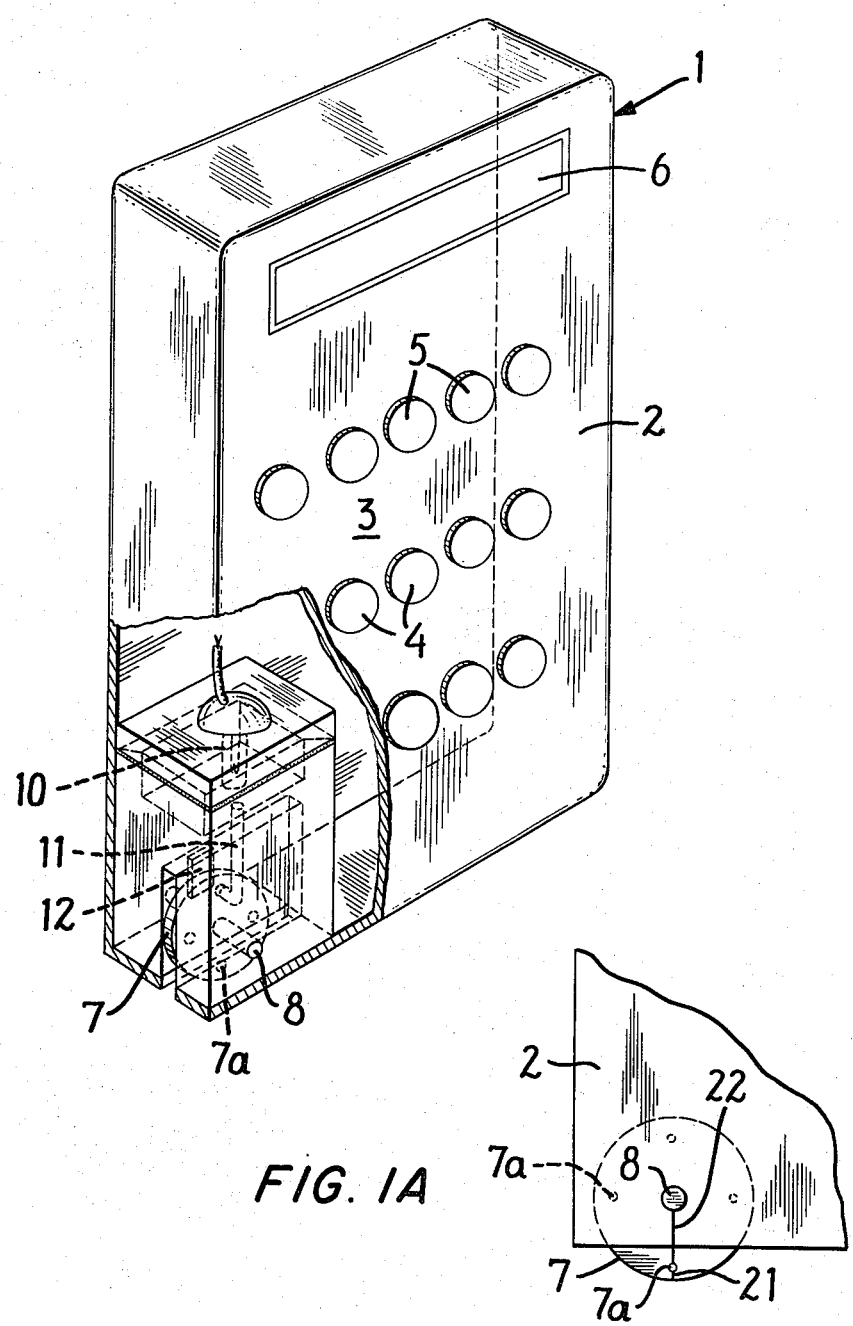
FIG. 1 is a perspective view of a measuring and calculating instrument in accordance with the invention with a portion of the casing broken away to show internal construction.
FIG. 1A is a side view of a corner portion of the instrument.

As illustrated schematically in the drawings, a measuring and calculating instrument 1 comprises a generally rectangular case 2 of a size to be held conveniently in the hand. By way of example the case may have a width of about 7 cm, a length of about 12 cm and a thickness of about 2 cm. The instrument is provided with an appropriate key board 3 comprising numerical keys 4 for entry of numerical values into the calculator and function keys 5 for controlling arithmetic operations by the calculator circuitry (not shown) contained in the case. The instrument is also provided with an appropriate indicator or display device 6 for displaying the data entered by the numerical keys and the results of calculations performed as determined by operation of the function keys. The display device 6 may be of any suitable type, for example LED or LCD. The calculator may, if desired, be programmable or may be provided with a memory as is well known in hand-held calculators but for the purpose of attaining simplicity, smaller size and lower cost such functions may be omitted.

Figure 2:
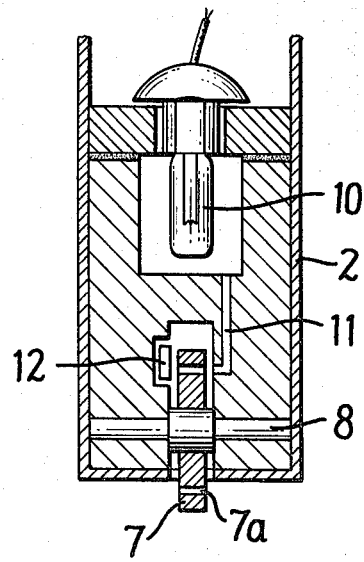
FIG. 2 is a partial schematic sectional view taken approximately on the line 2—2 in FIG. 1.

In accordance with the invention the instrument is provided at one corner of the case with a measuring wheel 7 which is rotatably supported by an axis 8 so that the measuring wheel projects beyond the perimeter of the case, as illustrated in FIGS. 1 1A and 2 in such manner that the measuring wheel can be rolled along a selected line, for example of a drawing, map or chart, by holding the case in the hand and moving it along the selected line. As illustrated by way of example in the drawings, the measuring wheel is rotatably mounted in a slot provided in the lower left-hand corner of the instrument. The peripheral edge of the measuring wheel 7 is preferably serrated or roughened so that it does not skid on the surface to which it is applied.

Means is provided for sensing rotation of the measuring wheel 7 and generating a unit signal pulse for each increment of rotation. The sensing means should be of such nature that it does not impede rotation of the measuring wheel. As illustrated by way of example in the drawings, the measuring wheel is provided with a plurality of small openings 7a which are equally spaced from the axis of the wheel and are equally spaced from one another in a circumferential direction. At one side of the measuring wheel there is provided a light emitter positioned so that light shines through the holdes 7a when they are in registry with the emitter. At the opposite side of the wheel there is provided a light-sensing element which receives light passing through the holes 7a in the measuring wheel.

As illustrated in the drawings, the light emitter comprises a light source 10 which may, for example be a small incandescent lamp or a light-emitting diode. A light conductor 11 transmits light from the light source 10 to a point adjacent one side of the measuring wheel 7. The light conductor 11 may, for example be glass or plastic rod or a bundle of glass or plastic fibers. The light conductor 11 is bent so that one end receives light from the light source 10 while the other end is directed toward a side of the measuring wheel 7 in position to direct light rays through the openings 7a when they are aligned with the end of the light conductor.

The light sensing element on the other side of the measuring wheel 7 is illustrated as comprising a photocell 12 which is positioned so as to receive light shining through the openings 7a of the measuring wheel as they come into alignment with the adjacent end of the light conductor 11. The photocell 12 produces a signal pulse each time one of the openings 7a of the measuring wheel 7 moves past it. As the measuring wheel 7 is shown by way of the example as having four openings 7a, four pulses will be generated by the photocell 12 each time the measuring wheel makes one revolution in rolling along a line to be measured. These pulses are automatically fed to the calculator circuitry and are entered as a data input.

Figure 3:
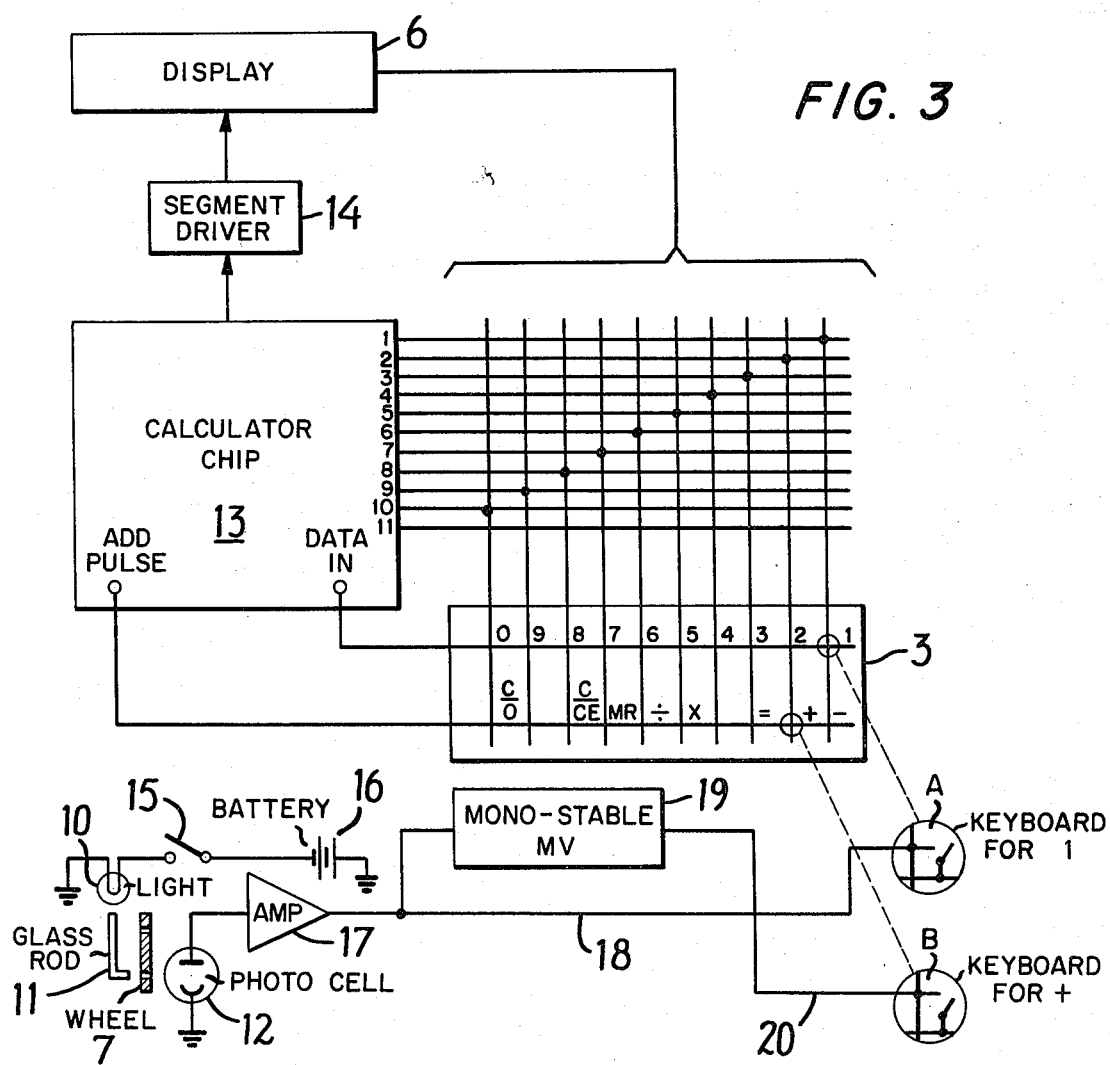
FIG. 3 is a circuit diagram.

The circuitry of an instrument in accordance with the present invention is shown by way of example in FIG. 3. The circuit is shown as comprising the key board 3, a calculator chip 13 and a segment driver 14 for the display 6. As the calculator circuitry is well know it is shown only in block diagram.

The measuring circuit comprises a switch 15 for connecting the light 10 with a battery 16 which may be the battery of the calculator. The switch 15 is manually operable so that the light 10 can be turned on when it is desired to carry out a measuring operation. If desired, the switch 15 may be the regular ON - OFF switch of the calculator. However, it is considered preferable to have a separate switch since the calculator may sometimes be used without a measuring function.

In FIG. 3 the elements A and B are blown up elements of the calculator key board 3. Element A represents the "1" input of the key board while element B represents the "+" function. The output of the photocell 12 is connected through an amplifier 17 and a line 18 to element A of the key board. It will be noted that the line 18 is connected directly to the "1" input of the key board thus bypassing the manually operable key switch. Thus each pulse received by the element A from the photocell is equivalent to manually pressing the "1" key of the key board.

The output of the photocell 12 is also connected through the amplifier 17, a monostable multivibrator 19 and a line 20 to the element B of the key board. It will be noted that the line 20 is connected directly to the "+" input of the key board thus bypassing the manually operable "+" key switch. Thus a pulse supplied to element B through line 20 is equivalent to manually pressing the "+" key of the key board. The monostable multivibrator 19 serves as a delay circuit so that when a pulse is produced by the photocell 12, a pulse is applied through line 18 to element A of the key board whereafter a delayed pulse is applied through line 20 to element B. This is equivalent to the manual operation of pressing the "1" key of the key board and then pressing the "+" key. Thus as successive pulses are produced by the photocell 12 through rotation of the measuring wheel 7 a series of "1"s are sequentially added by the calculator to obtain a running total. The unit entries and the totals are displayed in usual manner by the display device 6. The final total represents the length of the line measured by the measuring wheel 7.

After a measurement has thus been automatically entered in the calculator further arithmetic operations can be carried out in usual manner by manual operation of the key board, numerical and function keys. For example the measurement can be multiplied by a desired factor or may be divided or squared.

The diameter of the measuring wheel 7 and the number of holes 7a provided in the wheel are selected so that when the instrument is used on a scale drawing of the most commonly used scale, the display device 6 will display the measurement directly in units of measurement, for example feet. If the instrument is used on a drawing, map or chart of different scale, the measurement after being fed into the instrument by rolling the measuring wheel 7 along the line to be measured is multiplied or divided by the proper conversion factor. A table of such conversion factors is preferably on the back of the instrument.

The usefulness of a measuring and calculating instrument in accordance with the present invention is illustrated by the following examples.

EXAMPLE 1

To determine from a scale drawing, the linear feet of a certain size pipe, conduit or electrical cable required for a job, the calculator is manually cleared and the measuring wheel 7 is set to zero by bringing into alignment indices 21 and 22 provided on the measuring wheel and on the case, as illustrated in FIG. 2. The measuring wheel is then rolled on the scale drawing to obtain a measurement of linear feet. Such measurement is directly entered in the calculator as described above and displayed on the display device 6. If a cost estimate is desired, the result can be multiplied by the cost per foot by manual manipulation of the numerical and function keys of the key board.

EXAMPLE 2

To determine the cost of fencing of a parcel of land shown on a scale map, the calculator is cleared and the measuring wheel 7 is set to zero, as in Example 1. The measuring wheel is then rolled completely around the perimeter of the parcel of land as shown on the map thereby obtaining the number of feet of fencing required. This will be displayed on the display device 6. The cost is then determined by manual manipulation of the key board keys to multiply the result by the cost per foot.

EXAMPLE 3

To determine the rent for a given area in a building from a scale floor plan of the building, the calculator is cleared and the measuring wheel is set to zero as in Example 1. The length is then measured by rolling the measuring wheel along the long side of the area and the result as read from the display device 6 is jotted down on a piece of paper. The calculator is then cleared and reset and the width of the area is measured in like manner. The width thus entered in the calculator is multiplied by the previously noted length and the result is then multiplied by the amount of rent per square foot. If the calculator has storage facilities, the length instead of being written on a piece of paper is stored and then recalled for multiplication with the width.

It will thus be seen that the measuring and calculating instrument in accordance with the present invention is highly useful for many operations and is convenient, simple and easy to use.

While a preferred embodiment of the invention has been illustrated by way of example in the drawings and is herein particularly described, it will be understood that many variations and modifications may be made and that the invention is thus in no limited to the illustrated embodiment.

What is claimed is:

1. A miniature hand-held calculator comprising a rectangular case of a size to be held conveniently in the hand, calculator circuitry in said case, a keyboard on said case comprising manually operable numerical keys and function keys and means operable by said keys for feeding data entries into said circuitry and controlling the functions of said circuitry to perform arithmetic operations on said entries, display means providing a readout for said circuitry, a measuring wheel rotatably supported by said case and projecting beyond the perimeter of said case whereby said wheel can be rolled along a selected stationary line by manual movement of said hand-held calculator along said line, means for sensing rotation of said wheel and generating a unit signal pulse for each increment of rotation of said wheel, and means electrically connecting said sensing means with said calculator circuitry for feeding said unit signal pulses into said circuitry as units of measurement and for adding said units to obtain a total measurement entry representing the length of said line, whereupon said numerical keys and function keys of said keyboard are manually operable to perform additional arithmetic operations on said entry from said sensing means including multiplication of said entry by a selected number.

2. A hand-held calculator according to claim 1, in which said sensing means comprises openings in said wheel, a light emitter on one side of said wheel and a light-sensing element on the opposite side of said wheel.

3. A hand-held calculator according to claim 2, in which said emitter comprises a light source and a light conductor positioned to conduct light from said source to a position at one side of said wheel.

4. A hand-held calculator according to claim 1, in which said numerical keys include a "1" key connected to a "1" input of said calculator circuitry and said function keys include a "+" key connected to a "+" input of said calculator circuitry and in which said means for feeding unit signal pulses into said calculator circuitry comprises a connection from said sensing means to said "1" input bypassing said "1" key and a connection from said sensing means to said "+" input bypassing said "+" key.

5. A hand-held calculator according to claim 4, in which said connection from said sensing means to said "+" input includes delay means whereby pulses are fed from said sensing means to said "1" input and said "+" input sequentially.

6. A hand-held calculator according to claim 4, in which said means for feeding unit signal pulses into said calculator circuitry includes means for amplifying said signal pulses.

7. A self-containing hand-held measuring and calculating instrument bodily movable in contact with a surface to be measured, comprising miniature electronic calculator means, a measuring wheel rotatably supported by said calculator means and adapted to be rolled along a surface to be measured, means actuated by incremental rotation of said measuring wheel for entering into said calculator means a value representing a linear measurement made by rolling said measuring wheel along said surface, said calculator means including means for performing a multiplication operation on said value and digital readout display means operable to display the value representing said linear measurement and to display the product of said multiplication operation.

8. A self-containing hand-held measuring and calculating instrument bodily movable in contact with a surface to be measured, comprising electronic calculator means, a measuring wheel rotatably supported by said calculator means and adapted to be rolled over a surface to be measured, pulse generating means actuated by rotation of said measuring wheel for entering into said calculator means a number of pulses representing a linear measurement made by rolling said measuring wheel over said surface, said calculator means including means for performing a multiplication operation and digital readout display means operable to display a number corresponding to said linear measurement made by said measuring wheel rolling over said surface and to display the product of said multiplication operation.

* * * * *